US012809149B2

(12) United States Patent
Kobayashi et al.

(10) Patent No.: US 12,809,149 B2
(45) **Date of Patent: *Nov. 24, 2026**

(54) LIGHT IRRADIATION DEVICE AND SAMPLE OBSERVATION APPARATUS

(71) Applicant: HAMAMATSU PHOTONICS K.K., Hamamatsu (JP)

(72) Inventors: Masanori Kobayashi, Hamamatsu (JP); Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 121 days.

This patent is subject to a terminal disclaimer.

(21) Appl. No.: 18/911,797

(22) Filed: Oct. 10, 2024

(65) Prior Publication Data

US 2025/0035901 A1 Jan. 30, 2025

Related U.S. Application Data

(63) Continuation of application No. 17/924,160, filed as application No. PCT/JP2021/010878 on Mar. 17, 2021, now Pat. No. 12,140,742.

(30) Foreign Application Priority Data

May 27, 2020 (JP) ................................ 2020-092274

(51) Int. Cl.
*G02B 21/00* (2006.01)
*G01N 21/64* (2006.01)

(52) U.S. Cl.
CPC ..... *G02B 21/0032* (2013.01); *G01N 21/6456* (2013.01); *G01N 2201/06113* (2013.01)

(58) Field of Classification Search
None
See application file for complete search history.

(56) References Cited

U.S. PATENT DOCUMENTS 5,148,315 A 9/1992 Tamari
5,473,426 A 12/1995 Hayano et al.
(Continued)

FOREIGN PATENT DOCUMENTS

CN 102298206 A 12/2011
CN 109844606 A 6/2019
(Continued)

OTHER PUBLICATIONS

International Preliminary Report on Patentability issued Dec. 8, 2022 in WO Patent Application No. PCT/JP2021/010878.

*Primary Examiner* — Uzma Alam
*Assistant Examiner* — Mamadou Faye
(74) *Attorney, Agent, or Firm* — FAEGRE DRINKER BIDDLE & REATH LLP

(57) ABSTRACT

A light irradiation device includes: a light source configured to output light having coherence; a light focusing element having a focusing axis and a non-focusing axis intersecting with the focusing axis and configured to focus the light on a focusing line so as to generate planar light; and an aperture mask having an opening part that limits a part of luminous fluxes of the light transmitted from the light source to the light focusing element. The opening part of the aperture mask has opening edges disposed to extend in a direction along the focusing axis of the light focusing element, and, in a case in which the opening edges are projected onto the focusing line, corresponding projected portions have linear spreads.

5 Claims, 11 Drawing Sheets

(56) References Cited

U.S. PATENT DOCUMENTS

| | | | |
|---|---|---|---|
| 5,479,011 A | 12/1995 | Rudeen et al. | |
| 6,488,208 B1 | 12/2002 | Runge et al. | |
| 12,140,742 B2 * | 11/2024 | Kobayashi ............. | G02B 21/06 |
| 2005/0111514 A1 | 5/2005 | Matsumoto et al. | |
| 2012/0135405 A1 * | 5/2012 | Toumbas ............. | G01N 21/532<br>436/63 |
| 2018/0088305 A1 | 3/2018 | Itoh et al. | |

FOREIGN PATENT DOCUMENTS

| | | |
|---|---|---|
| JP | H02-096111 A | 4/1990 |
| JP | H06-167458 A | 6/1994 |
| JP | 2005-158884 A | 6/2005 |
| JP | 2018-063292 A | 4/2018 |
| JP | 2019-184275 A | 10/2019 |

* cited by examiner

LIGHT IRRADIATION DEVICE AND SAMPLE OBSERVATION APPARATUS

TECHNICAL FIELD

The present disclosure relates to a light irradiation device and a sample observation apparatus.

BACKGROUND ART

As one of methods for observing the inside of a sample having a three-dimensional stereoscopic structure such as a cell or the like, selective plane illumination microscopy (SPIM) is known. As a technology relating to such a technique, for example, there is a sample observation apparatus described in Patent Literature 1. The sample observation apparatus of this Patent Literature 1 is configured to include an irradiation optical system that irradiates a sample with planar light, a scanning unit that scans a sample for an irradiation face of planar light, and an imaging optical system that has an observation axis inclined with respect to the irradiation face and forms an image of observation light generated in a sample in accordance with irradiation of planar light. Then, a plurality of pieces of partial image data corresponding to a part of an optical image according to observation light formed as an image by the imaging optical system are acquired, and observation image data of a sample is generated on the basis of such partial image data.

CITATION LIST

Patent Literature

[Patent Literature 1] Japanese Unexamined Patent Publication No. 2018-063292

SUMMARY OF INVENTION

Technical Problem

For example, the planar light used in the sample observation apparatus described above is formed by focusing light emitted from a light source using a light focusing element such as a cylindrical lens or the like. In irradiation of planar light onto a sample, it is preferable to limit an irradiation range of the planar light by disposing an aperture mask on an optical path such that observation areas of the sample adjacent to each other are not irradiated with the planar light. However, coherent light, for example, such as laser light is light having coherence, and thus interference fringes due to diffraction on the edge of the aperture mask are generated, and there is concern that a radiation illuminance distribution of the planar light may become non-uniform.

The present disclosure is for solving the problems described above, and an object thereof is to provide a light irradiation device and a sample observation apparatus capable of outputting planar light having a uniform radiation illuminance distribution.

Solution to Problem

According to one aspect of the present disclosure, there is provided a light irradiation device including: a light source configured to output light having coherence; a light focusing element having a focusing axis and a non-focusing axis intersecting with the focusing axis and configured to focus the light on a focusing line so as to generate planar light; and an aperture mask having an opening part that limits a part of luminous fluxes of the light transmitted from the light source to the light focusing element, in which the opening part of the aperture mask has opening edges disposed to extend in a direction along the focusing axis of the light focusing element, and, in a case in which the opening edges are projected onto the focusing line, corresponding projected portions have linear spreads.

In this light irradiation device, in the opening part of the aperture mask, in a case in which the opening edges disposed to extend in a direction along the focusing axis of the light focusing element are projected onto the focusing line, corresponding projected portions have linear spreads. In an aperture mask in which a corresponding projected portion is punctiform in a case in which the opening edges are projected onto the focusing line, interference fringes due to diffraction in the opening edges are mutually strengthened, and a radiation illuminance distribution of planar light tends to be non-uniform. In contrast to this, in an aperture mask in which the corresponding projected portions have linear spreads, interference fringes due to diffraction in the opening edges are not strengthened together, and the radiation illuminance distribution of the planar light can be uniformized. Thus, this light irradiation device can output planar light having a uniform radiation illuminance distribution.

The opening part may have an asymmetrical shape with respect to the focusing line. In addition, the opening edges may have shapes protruding to an outer side with respect to the focusing line. The opening part may have a hexagonal shape. According to such a configuration, interference fringes due to diffraction in the opening edges are further suppressed, and the radiation illuminance distribution of the planar light is further uniformized.

The opening part may have a trapezoid shape. The opening edges may have a zigzag shape. The opening edges may have a shape protruding to an outer side of the focusing line. Also in such a configuration, interference fringes due to diffraction in the opening edges are further suppressed, and the radiation illuminance distribution of the planar light is further uniformized.

The opening part may have a quadrangle shape, and the opening edges may intersect with the focusing axis at a predetermined angle. Also in such a configuration, interference fringes due to diffraction in the opening edges are further suppressed, and the radiation illuminance distribution of the planar light is further uniformized.

The light source may be a light source that outputs laser light as the light. The laser light is light, from which high radiation illuminance can be acquired, but has high coherence, and interference fringes due to diffraction in edges of an aperture mask may be easily generated. Thus, by applying an aperture mask having the configuration described above to laser light, planar light having a uniform radiation illuminance distribution can be appropriately output.

According to one aspect of the present disclosure, there is provided a sample observation apparatus including: the light irradiation device described above; and a detection unit configured to detect observation light generated in a sample in accordance with irradiation of the planar light from the light irradiation device.

In this sample observation apparatus, interference fringes due to diffraction in the opening edges of the aperture mask are not strengthened together, and the radiation illuminance distribution of the planar light can be uniformized. Thus, in this sample observation apparatus, by irradiating a sample with planar light of which the radiation illuminance distribution is uniformized, observation of the sample can be performed with high accuracy.

Advantageous Effects of Invention

According to the present disclosure, planar light having a uniform radiation illuminance distribution can be output.

DESCRIPTION OF EMBODIMENTS

Hereinafter, preferred embodiments of a light irradiation device and a sample observation apparatus according to one aspect of the present disclosure will be described in detail with reference to the drawings.

Figure 1:
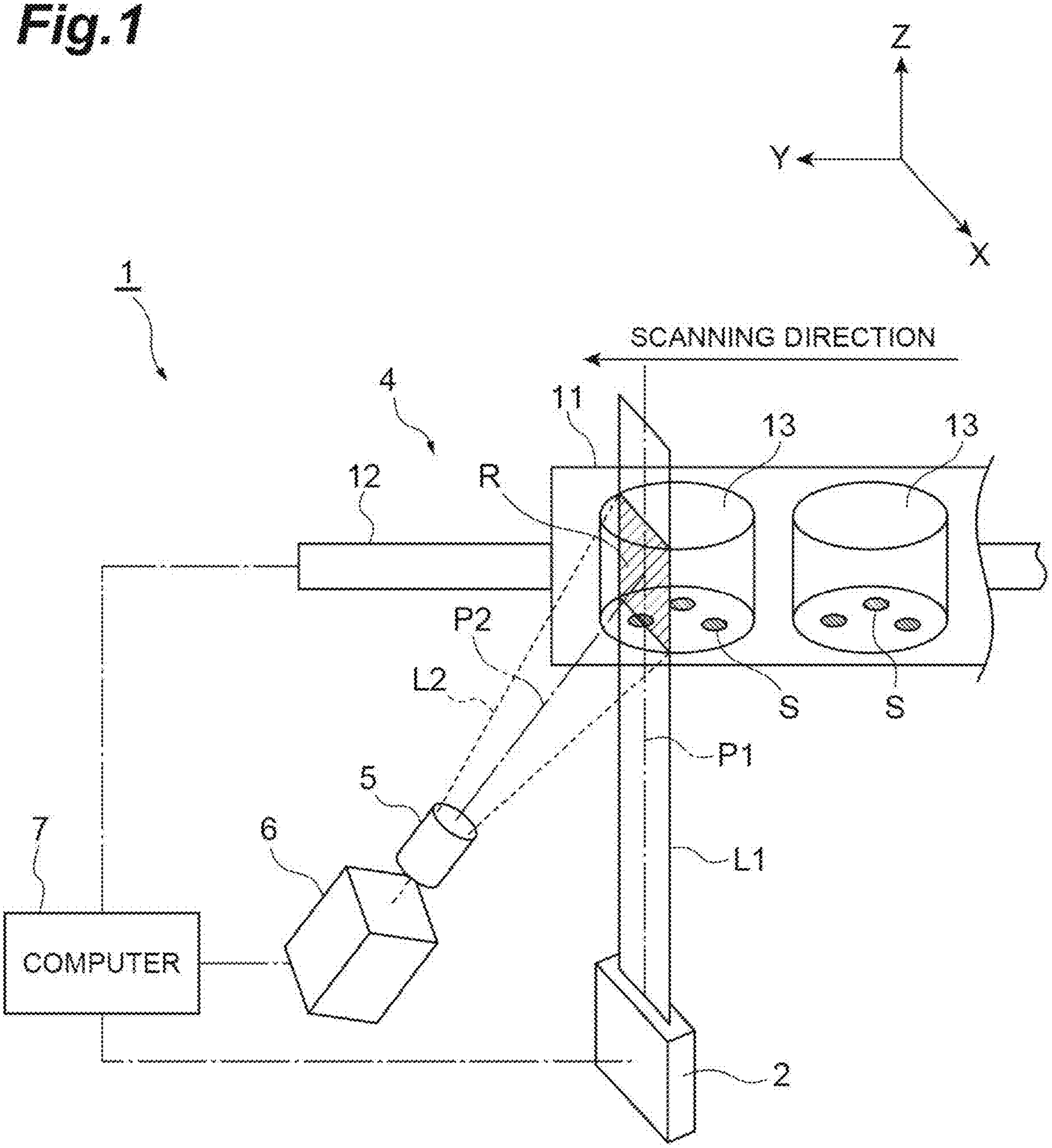
FIG. 1 is a schematic configuration diagram illustrating a sample observation apparatus according to an embodiment.

FIG. 1 is a schematic configuration diagram illustrating a sample observation apparatus according to an embodiment. This sample observation apparatus 1 is an apparatus that acquires observation image data of the inside of a sample S by irradiating the sample S with planar light L1 and forming an image of light (for example, fluorescence, scattering light, or the like) generated inside the sample S in accordance with the irradiation of the planar light L1 on an imaging surface. As a sample observation apparatus 1 of such a type, there is a slide scanner that acquires and displays an image of a sample S stored in a slide glass, a plate reader that acquires image data of a sample S stored on a micro plate and analyzes the image data, or the like. For example, as the sample S that is an observation target, there is a cell, a tissue, or an organ of a person or an animal, an animal or a plant, a cell, an organ, or the like of a plant, or the like. The sample S may be contained in a solution, a gel, or a material of which a refractive index is different from that of the sample S.

As illustrated in FIG. 1, the sample observation apparatus 1 is configured to include a light irradiation device 2, a scanning unit 4, an imaging optical system 5, an image acquiring unit (a detection unit) 6, and a computer 7. The light irradiation device 2 is a device that outputs planar light L1 to irradiate a sample S. The planar light L1 is light that can be acquired by shaping laser light or low coherent light into a planar shape. The planar light L1 output from the light irradiation device 2 advances along an optical axis P1, and a sample S is irradiated therewith. In the sample S that has been irradiated with the planar light L1, observation light L2 is generated on an irradiation surface R of the planar light L1. For example, the observation light L2 is fluorescence excited by the planar light L1, scattering light of the planar light L1, or a diffused reflected light of the planar light L1.

The scanning unit 4 is a mechanism that scans a sample S for the irradiation surface R of the planar light L1. In this embodiment, the scanning unit 4 is configured using a moving stage 12 that moves a sample container 11 storing a sample S. For example, the sample container 11 is a micro plate, a slide glass, a Petri dish, or the like. In this embodiment, a micro plate will be illustrated as an example. In the sample container 11, a plurality of wells 13 in which samples S are disposed are aligned, for example, in a linear shape (or a matrix shape). The sample container 11 may be fixed with respect to the moving stage 12. A bottom face of the well 13 serves as an input face of planar light L1 for a sample S disposed inside the well 13. The sample container 11 is disposed with respect to the moving stage 12 such that this input face is orthogonal to the optical axis P1 of the planar light L1.

As illustrated in FIG. 1, this moving stage 12 scans the sample container 11 in a direction set in advance in accordance with a control signal from the computer 7. In this embodiment, the moving stage 12 scans the sample container 11 in one direction within a plane orthogonal to the optical axis P1 of the planar light L1. Here, a direction of the optical axis P1 of the planar light L1 will be referred to as a Z axis, a scanning direction of the sample container 11 according to the moving stage 12 will be referred to as a Y axis, and a direction orthogonal to the Y axis within a plane that is orthogonal to the optical axis P1 of the planar light L1 will be referred to as an X axis. An irradiation surface R of the planar light L1 with respect to the sample S is a face within an XZ plane.

The imaging optical system 5 is an optical system that forms an image of the observation light L2 generated in the sample S in accordance with the irradiation of the planar light L1. For example, the imaging optical system 5 is configured to include an objective lens, an imaging lens, and the like. An optical axis of the imaging optical system 5 is an observation axis P2 of the observation light L2. In the example illustrated in FIG. 1, the observation axis P2 of the imaging optical system 5 is inclined with respect to the irradiation surface R of the planar light L1 in the sample S by a predetermined angle. An inclination angle of the observation axis P2 is in the state of coinciding with an angle formed by the optical axis P1 of the planar light L1 facing the sample S and the observation axis P2.

The image acquiring unit 6 is a part that detects observation light L2 formed as an image by the imaging optical system 5. For example, the image acquiring unit 6 is configured to include an imaging device that captures an optical image according to the observation light L2. Examples of the imaging device includes area image sensors such as a CMOS image sensor and a CCD image sensor. Such an area image sensor is disposed in the imaging surface according to the imaging optical system 5 and, for example, captures an optical image using a global shutter or a rolling shutter and outputs data of a two-dimensional image to the computer 7.

The computer 7, physically, is configured to include memories such as a RAM, a ROM, and the like, a processor (an arithmetic operation circuit) such as a CPU or the like, a communication interface, a storage unit such as a hard disk or the like, and a display unit such as a display or the like. Examples of the computer 7 include a personal computer, a cloud server, a smart device (a smartphone, a tablet terminal, or the like), and the like. The computer 7 executes a program stored in a memory using a CPU of the computer system, thereby functioning as a controller that controls operations of the light irradiation device 2 and the moving stage 12, an image generating unit that generates observation image data of a sample S, an analysis unit that analyzes the observation image data, and the like.

Next, the light irradiation device 2 described above will be described in more details.

Figure 2A:
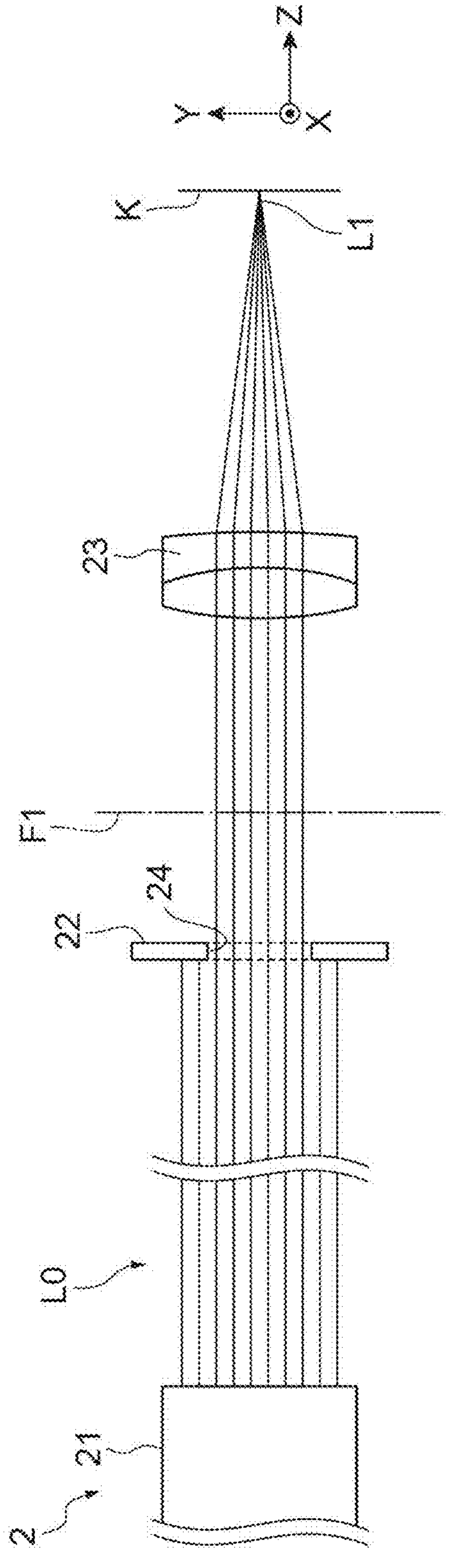
FIGS. 2A and 2B are schematic diagrams illustrating an example of a configuration of a light irradiation device.
Figure 2B:
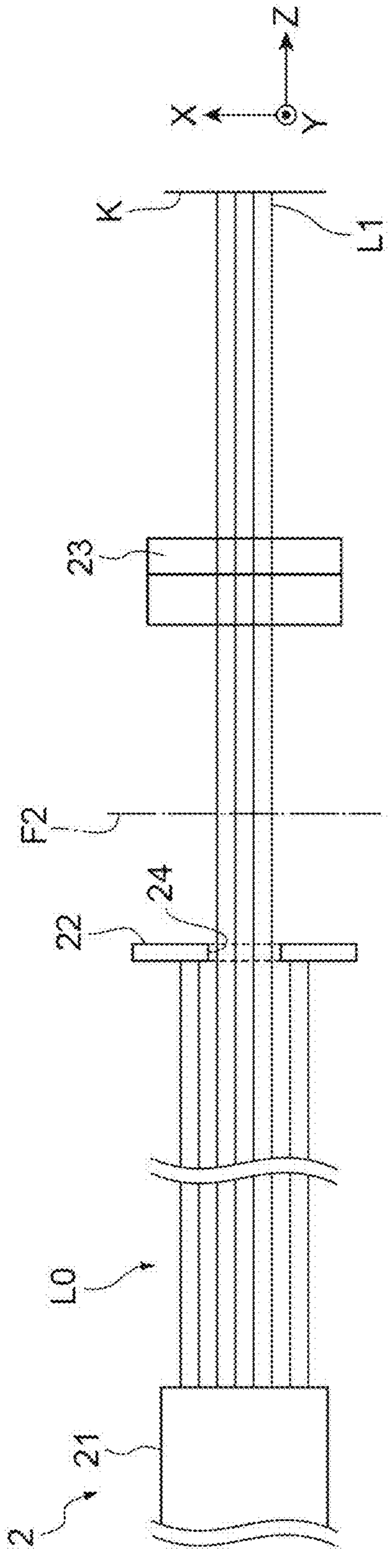

FIGS. 2A and 2B are schematic diagrams illustrating an example of a configuration of the light irradiation device. As illustrated in the drawing, although details will be described below, the light irradiation device 2 is configured to include a light source 21 that outputs light L0, an aperture mask 22 that limits a part of luminous fluxes of the light L0, and a light focusing element 23 that generates planar light L1 by focusing the light L0. Examples of the light source 21 include laser light sources such as a laser diode and a solid-state laser light source. The light source 21 is not limited to a light source that outputs laser light and, for example, may be a light source that outputs low coherent light such as a super luminescent diode (SLD). Both the laser light and the low coherent light are light having coherence. The aperture mask 22A has an opening part 24 that limits a part of luminous fluxes of the light L0 transmitted from the light source 21 toward the light focusing element 23. By limiting a part of the luminous fluxes of the light L0 using the opening part 24, an irradiation range of the planar light L1 output from the light irradiation device 2 can be limited such that observation areas adjacent to each other with respect to a sample S disposed in the sample container 11 of the sample observation apparatus 1 are not irradiated with the planar light.

The light focusing element 23, for example, is configured using a cylindrical lens, an axicon lens, a freeform lens, a spatial light modulator, or the like and is optically coupled with the light source 21. This light focusing element 23 has a focusing axis F1 and a non-focusing axis F2 that intersects with (here, orthogonal to) the focusing axis F1 and generates planar light L1 by focusing the light L0 that has passed through the opening part 24 on a focusing line K. In the example illustrated in FIG. 2, the light focusing element 23 is a cylindrical lens. FIG. 2A illustrates an optical axis of the light L0 on a focusing axis-side cross-section (a YZ cross-section) of the light focusing element 23, and FIG. 2B illustrates an optical axis of the light L0 on a non-focusing axis-side cross-section (an XZ cross-section) of the light focusing element 23.

As illustrated in FIG. 2A, when seen from the focusing axis-side cross-section (the YZ cross-section), the light L0 that has passed through the opening part 24 passes through the light focusing element 23, thereby being focused along the focusing axis F1 of the light focusing element 23. On the other hand, as illustrated in FIG. 2B, when seen from the non-focusing axis-side cross-section (the XZ cross-section), the light L0 that has passed through the opening part 24 maintains a state that is a state before incidence to the light focusing element 23 without being focused by the light focusing element 23. Thus, by passing through the light focusing element 23, the light L0 is focused in only one axis (the Y axis) of the focusing axis F1 to become planar light L1 having a constant width in the X-axis direction.

Here, as described above, in a case in which an aperture mask is disposed on an optical path of coherent light such as laser light, generally, coherent light is light having strong coherence, and thus there is a problem in that interference fringes are generated in laser light after passage of an opening part due to diffraction in an opening edge of the aperture mask. This problem can similarly occur even in a case in which light passing through an opening part of the aperture mask is low coherent light. The interference fringes due to diffraction in the opening edge of the aperture mask overlap each other and are strengthened together when light is focused in a direction along a focusing axis by a light focusing element, and thus, it may be considered that a radiation illuminance distribution of planar light acquired by focusing light becomes non-uniform.

Figure 3A:
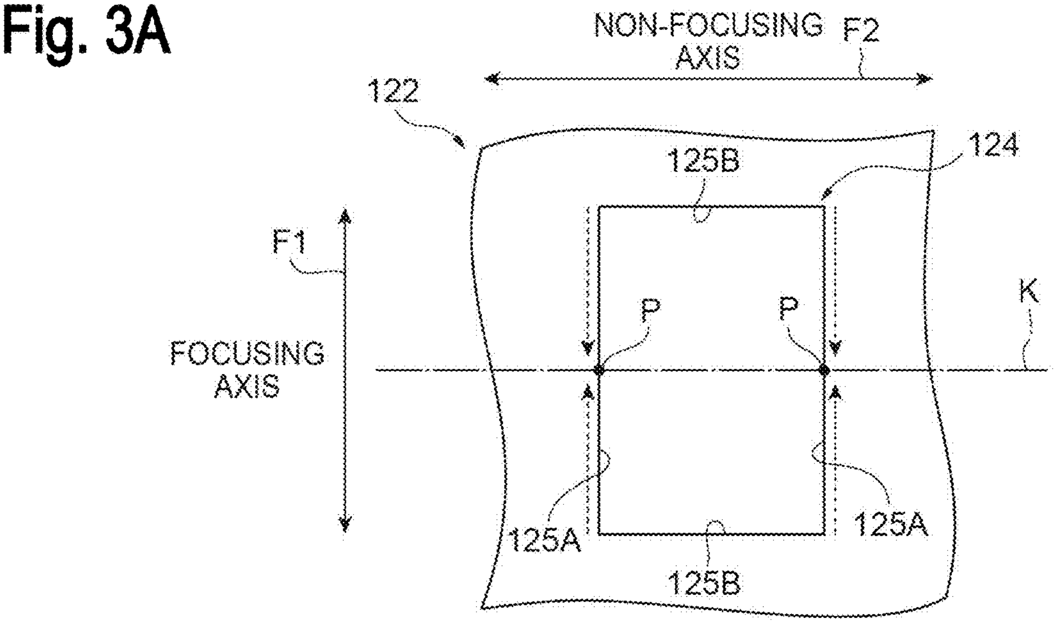
FIG. 3A is a diagram illustrating a shape of an opening part of an aperture mask according to a comparative example.

FIG. 3A is a diagram illustrating a shape of an opening part of an aperture mask according to a comparative example. The aperture mask 122 according to this comparative example has an opening part 124 having a rectangular shape (a quadrangle shape) including opening edges 125A corresponding to a long side and opening edges 125B corresponding to a short side. The aperture mask 122 is disposed on an optical path of light L0 such that the opening edges 125A extend in a direction parallel to a focusing axis F1 of a light focusing element 23, and the opening edges 125B extend in a direction orthogonal to the focusing axis of the light focusing element 23 when seen in a direction of the optical axis of the light L0. A focusing line K of the light L0 according to the light focusing element 23 is positioned at a line joining centers of the left and right opening edges 125A and 125A when seen in the direction of the optical axis of the light L0.

In the aperture mask 122 according to this comparative example, as illustrated in FIG. 3A, in a case in which the opening edge 125A is projected onto a focusing line, a projected portion P on the focusing line K of the opening edge 125A is formed to have a punctiform. For this reason, in the aperture mask 122, when the light L0 that has passed through the opening part 124 is focused by the light focusing element 23, interference fringes due to diffraction in the opening edge 125A are superimposed as one point on the focusing line K and are strengthened together.

Figure 3B:
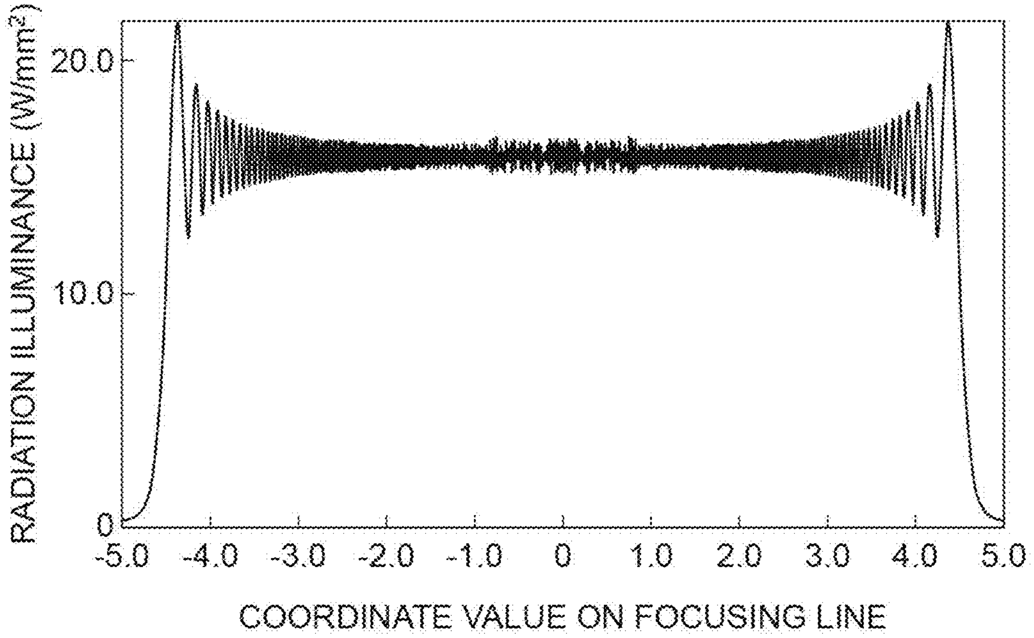
FIG. 3B is a graph representing a radiation illuminance distribution of planar light acquired in a case in which this aperture mask is used.

FIG. 3B is a graph representing a radiation illuminance distribution of planar light acquired in a case in which the aperture mask according to a comparative example is used. In the drawing, a coordinate value on the focusing line (X axis) is represented in a horizontal axis, and radiation illuminance of planar light is represented in a vertical axis. As illustrated in the drawing, in the planar light L1 acquired in a case in which the aperture mask according to the comparative example is used, the amplitude of the radiation illuminance distribution near both ends in the X-axis direction becomes large to be equal to or larger than 5 W/mm$^2$. While the amplitude of the radiation illuminance distribution decreases toward the center in the X axis direction, the amplitude of the radiation illuminance distribution near the center is about 1 W/mm$^2$. The amplitude of the radiation illuminance distribution represents a width between a maximum value and a minimum value in an area in which radiation illuminance is approximately uniform.

Figure 4A:
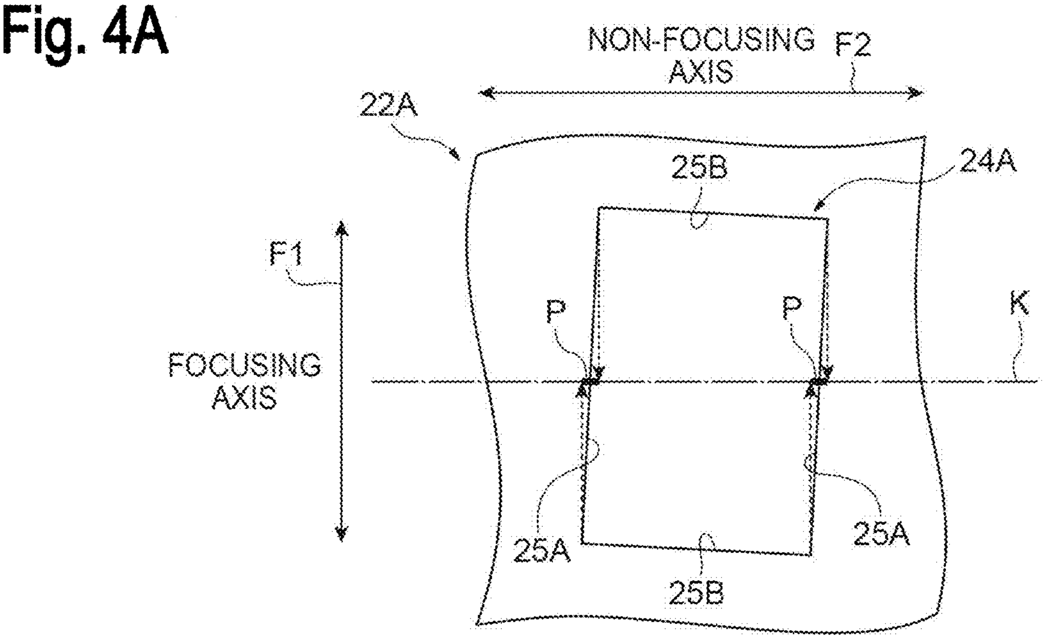
FIG. 4A is a diagram illustrating a shape of an opening part of an aperture mask according to an embodiment.

On the other hand, FIG. 4A is a diagram illustrating a shape of an opening part of an aperture mask according to an embodiment. This aperture mask 22A, similar to the comparative example, has an opening part 24A having a rectangular shape (a quadrangle shape) including opening edges 25A corresponding to a long side and opening edges 25B corresponding to a short side. In the aperture mask 22A, although the shape of the opening part 24A is the same as that of the opening part 124 of the comparative example, differently from the comparative example, the opening part 24A of the rectangular shape is in a state being rotated around an optical axis of light L0 by a predetermined angle. In accordance with this, in this aperture mask 22A, when seen in the direction of the optical axis of the light L0, a state is formed in which the opening edges 25A intersect with a direction parallel to a focusing axis F1 by a predetermined angle, and the opening edges 25B intersect with a direction parallel to a non-focusing axis by a predetermined angle.

For example, the predetermined angle is equal to or larger than 1° and equal to or smaller than 5°. By configuring the predetermined angle to be equal to or larger than 1°, an effect of reduction of interference fringes can be sufficiently exhibited. In addition, by configuring the predetermined angle to be equal to or smaller than 5°, an excessive spread of an edge of the radiation illuminance distribution can be suppressed, and an area in which radiation illuminance is flat can be sufficiently secured. Relating to setting of an optimal predetermined angle, a length of the opening part 24A in the direction of the focusing axis F1 may be also considered.

In the aperture mask 22A according to this embodiment, as illustrated in FIG. 4A, in a case in which the opening edge 25A is projected onto a focusing line, a projected portion P of the opening edge 25A on the focusing line K has a linear spread. For this reason, in the aperture mask 22A, when the light L0 that has passed through the opening part 24A is focused by a light focusing element 23, interference fringes due to diffraction in the opening edges 25A can be suppressed from overlapping each other on the focusing line K and being strengthened together.

Figure 4B:
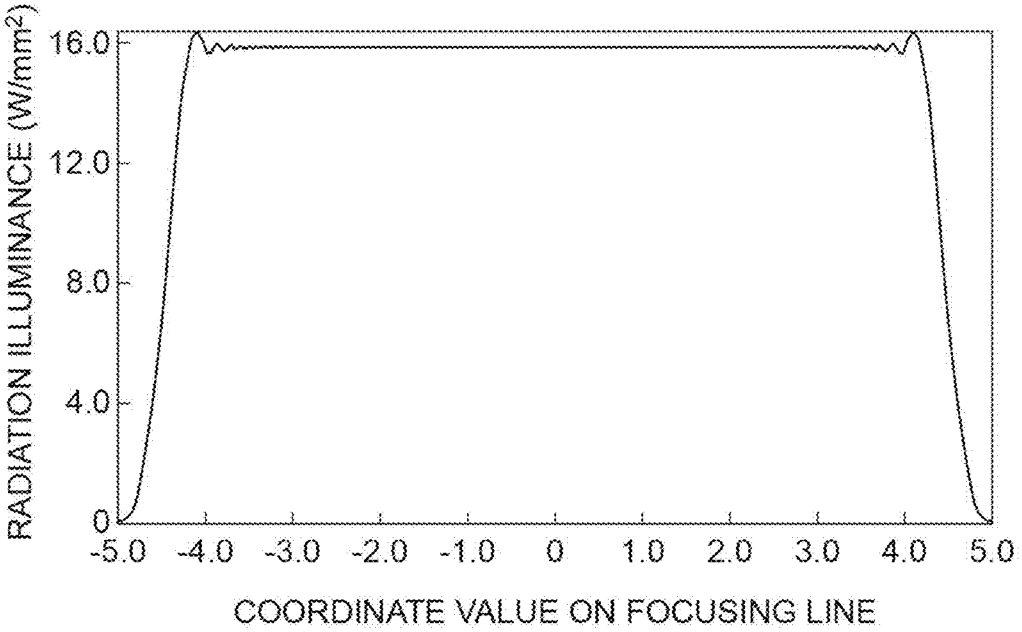
FIG. 4B is a graph representing a radiation illuminance distribution of planar light acquired in a case in which this aperture mask is used.

FIG. 4B is a graph representing a radiation illuminance distribution of planar light acquired in a case in which the aperture mask according to the embodiment is used. In the drawing, similar to FIG. 3B, a coordinate value on the focusing line (X axis) is represented in a horizontal axis, and radiation illuminance of planar light is represented in a vertical axis. As illustrated in the drawing, in the planar light L1 acquired in a case in which the aperture mask according to the embodiment is used, the amplitude of the radiation illuminance distribution near both ends in the X-axis direction is suppressed to be about 1 W/mm$^2$, and the amplitude of the radiation illuminance distribution near the center is suppressed to be nearly 0 W/mm$^2$.

As described above, in the light irradiation device 2, in a case in which the opening edges 25A that are disposed to extend in a direction along the focusing axis F1 of the light focusing element 23 are projected onto the focusing line K in the opening part 24A of the aperture mask 22A, a corresponding projected portion P has a linear spread. In the aperture mask 22 of the comparative example in which a corresponding projected portion P is in a punctiform in a case in which the opening edges 25A are projected onto the focusing line K, interference fringes due to diffraction in the opening edges 25A are strengthened together, and the radiation illuminance distribution of the planar light L1 tends to be non-uniform. In contrast to this, in the aperture mask 22A according to the embodiment in which the corresponding projected portion P has a linear spread, interference fringes due to diffraction in the opening edges 25A are not strengthened together, and the radiation illuminance distribution of the planar light L1 can be uniformized. Thus, in this light irradiation device 2, the planar light L1 having a uniform radiation illuminance distribution can be output.

As a technology for suppressing interference fringes due to diffraction of light on the opening edge of an aperture mask, for example, there is a technique in which an optical filter called an apodizing filter or a soft aperture is disposed on an optical path. In addition, there is also a technique in which a diffraction component is suppressed by disposing an aspherical lens on an optical path instead of an optical filter. However, in such techniques, an optical element needs to be optimized in accordance with a wavelength or a beam diameter of used laser light, and, in a case in which laser light not matching characteristics of the optical element is used, there is concern that the effect of suppressing interference fringes due to diffraction of light on an opening edge may not be sufficiently exhibited.

In contrast to this, the light irradiation device 2 suppresses interference fringes due to diffraction of light L0 on the opening edges 25A using the configuration of the opening edges 25A of the aperture mask 22A. In this technique, an optical element does not need to be optimized in accordance with a wavelength or a beam diameter of used light L0, and operations/effects are acquired for various kinds of light L0. As in the sample observation apparatus 1 represented in the embodiment described above, applications to devices assumed to irradiate a sample S with light L0 of different wavelengths or different beam diameters on the same axis as the planar light L1 are particularly meaningful.

Figure 5A:
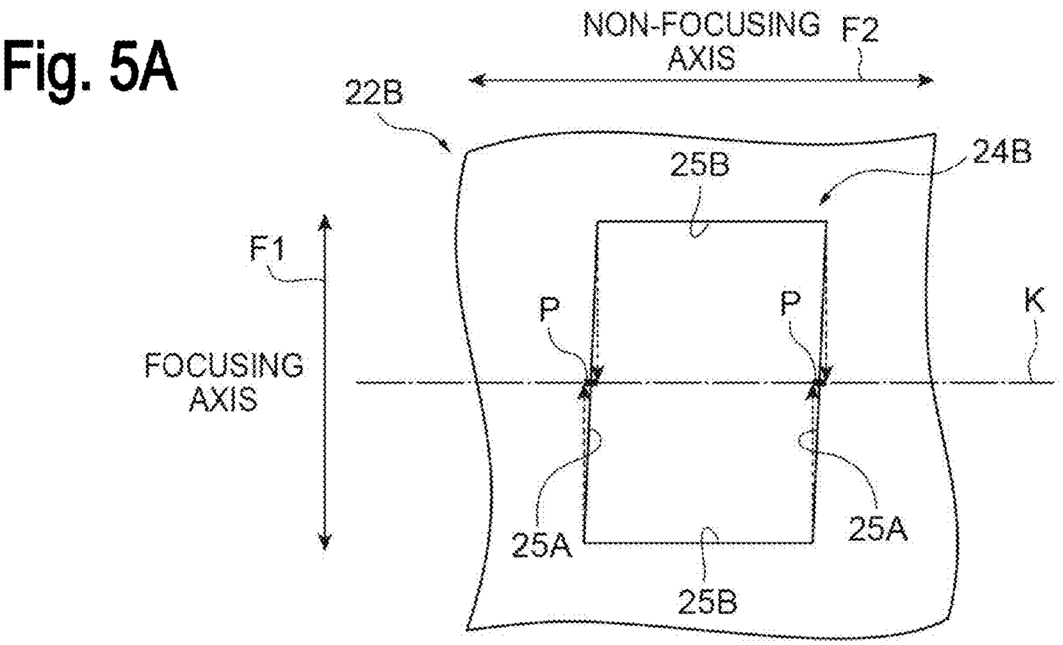
FIG. 5A is a diagram illustrating a shape of an opening part of an aperture mask according to another embodiment.

FIG. 5A is a diagram illustrating a shape of an opening part of an aperture mask according to another embodiment. In the aperture mask 22B illustrated in the drawing, instead of the configuration (see FIG. 4A) in which the opening part 24A having a rectangular shape is rotated around the optical axis of the light L0 by a predetermined angle, a shape of an opening part 24B is a parallelogram (a quadrangle shape). In accordance with this, in this aperture mask 22B, when seen in the direction of an optical axis of light L0, opening edges 25A are inclined with respect to a direction parallel to a focusing axis F1 by a predetermined angle, and opening edges 25B are in a state of being parallel to a non-focusing axis.

Figure 5B:
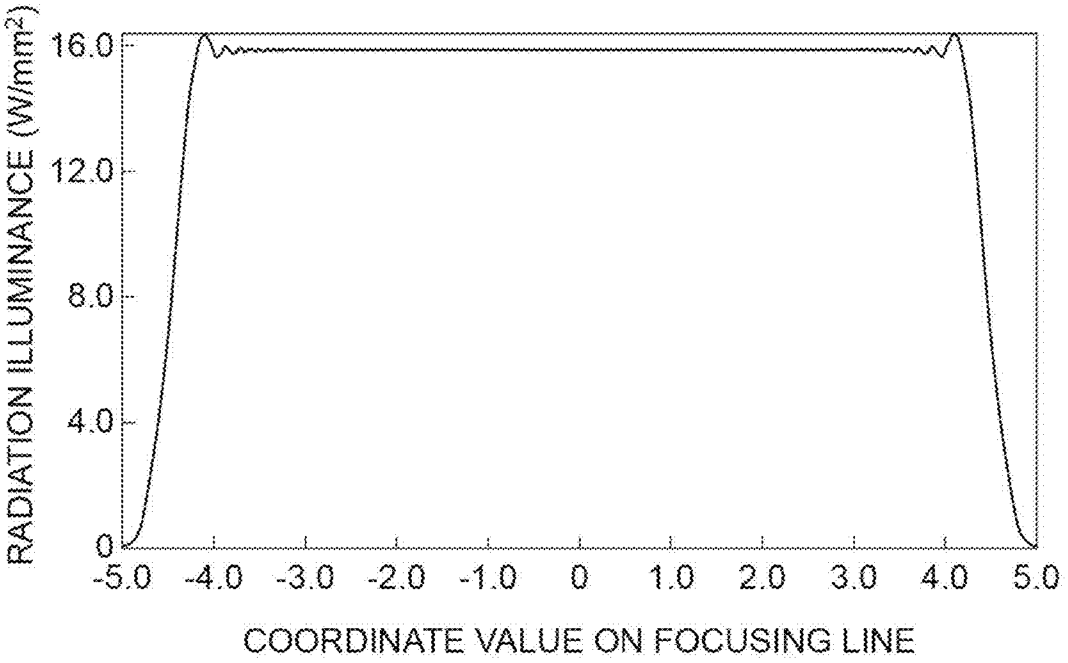
FIG. 5B is a graph representing a radiation illuminance distribution of planar light acquired in a case in which this aperture mask is used.

Also in such an aperture mask 22B, as illustrated in FIG. 5A, in a case in which the opening edge 25A is projected onto a focusing line, a projected portion P of the opening edge 25A on the focusing line K has a linear spread. For this reason, also in the aperture mask 22B, when light L0 that has passed through the opening part 24B is focused by a light focusing element 23, interference fringes due to diffraction in the opening edge 25A can be suppressed from overlapping each other on the focusing line K and being strengthened together. As illustrated in FIG. 5B, a radiation illuminance distribution of the planar light L1 formed in a case in which the aperture mask 22B is used is almost the same as that formed in a case in which the aperture mask 22A is used.

Figure 6A:
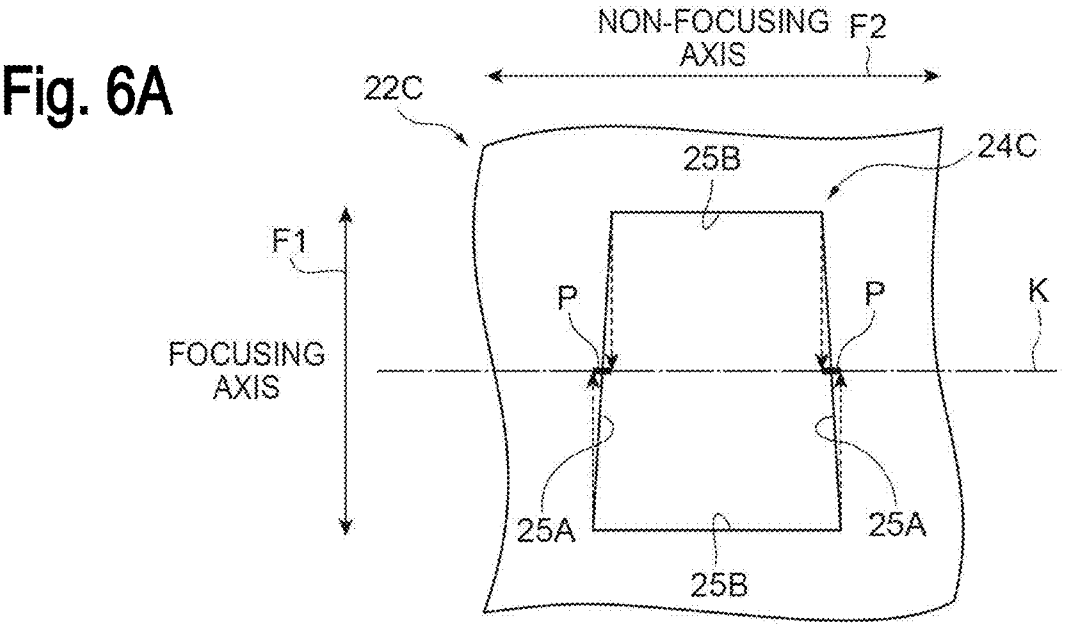
FIG. 6A is a diagram illustrating a shape of an opening part of an aperture mask according to still another embodiment.

FIG. 6A is a diagram illustrating a shape of an opening part of an aperture mask according to further another embodiment. In the aperture mask 22C illustrated in the drawing, an opening part 24C has an asymmetrical shape with respect to a focusing line K. More specifically, in the example illustrated in FIG. 6A, a shape of the opening part 24C is an isosceles trapezoid (a quadrangle shape). In accordance with this, in this aperture mask 22C, when seen in the direction of an optical axis of light L0, opening edges 25A are inclined with respect to a direction parallel to a focusing axis F1 by a predetermined angle, and opening edges 25B are in the state of being parallel to a non-focusing axis. In the drawing, although a length of a lower base of the opening part 24C in the direction of the non-focusing axis F2 is longer than a length of an upper base in the direction of the non-focusing axis F2, this relation in the lengths may be reversed.

Figure 6B:
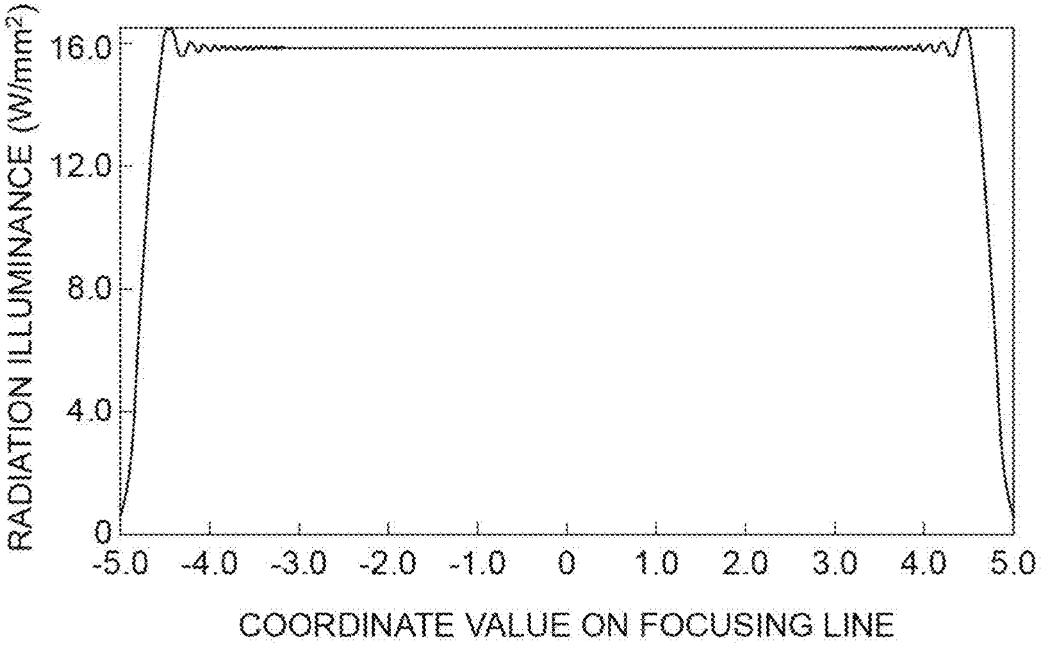
FIG. 6B is a graph representing a radiation illuminance distribution of planar light acquired in a case in which this aperture mask is used.

Also in such an aperture mask 22C, as illustrated in FIG. 6A, in a case in which the opening edge 25A is projected onto a focusing line, a projected portion P of the opening edge 25A on the focusing line K has a linear spread. For this reason, also in the aperture mask 22C, when light L0 that has passed through the opening part 24C is focused by a light focusing element 23, interference fringes due to diffraction in the opening edge 25A can be suppressed from overlapping each other on the focusing line K and being strengthened together. As illustrated in FIG. 6B, a radiation illuminance distribution of the planar light L1 formed in a case in which the aperture mask 22C is used is almost the same as that formed in a case in which the aperture mask 22A is used.

Figure 7A:
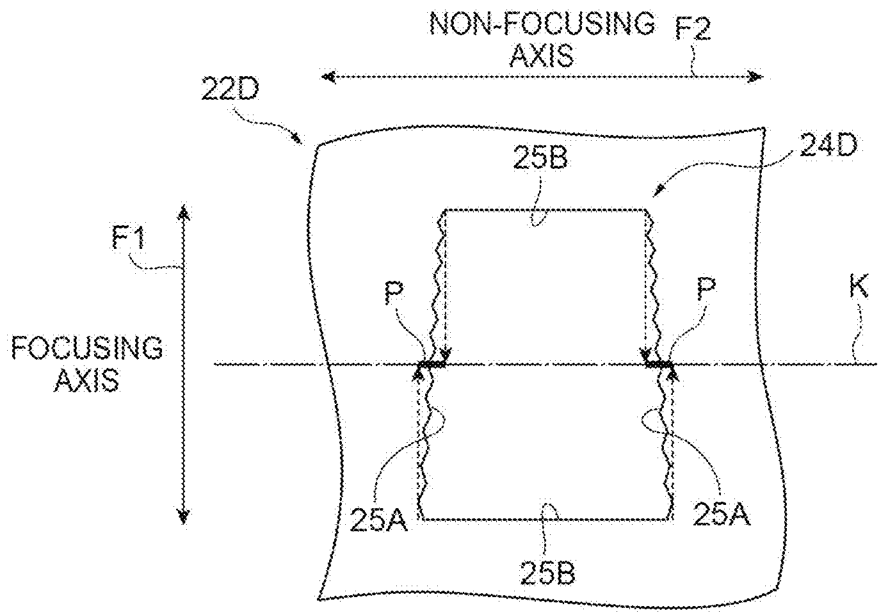
FIG. 7A is a diagram illustrating a shape of an opening part of an aperture mask according to further another embodiment.

FIG. 7A is a diagram illustrating a shape of an opening part of an aperture mask according to further another embodiment. In the aperture mask 22D illustrated in the drawing, similar to the aperture mask 22C, in addition to a shape of an opening part 24D being an isosceles trapezoid, opening edges 25A thereof are in a zigzag shape. Also in such an aperture mask 22D, in a case in which the opening edge 25A is projected onto a focusing line, a projected portion P of the opening edge 25A on the focusing line K has a linear spread. For this reason, also in the aperture mask 22D, when light L0 that has passed through the opening part 24D is focused by a light focusing element 23, interference fringes due to diffraction in the opening edge 25A can be suppressed from overlapping each other on the focusing line K and being strengthened together.

Figure 7B:
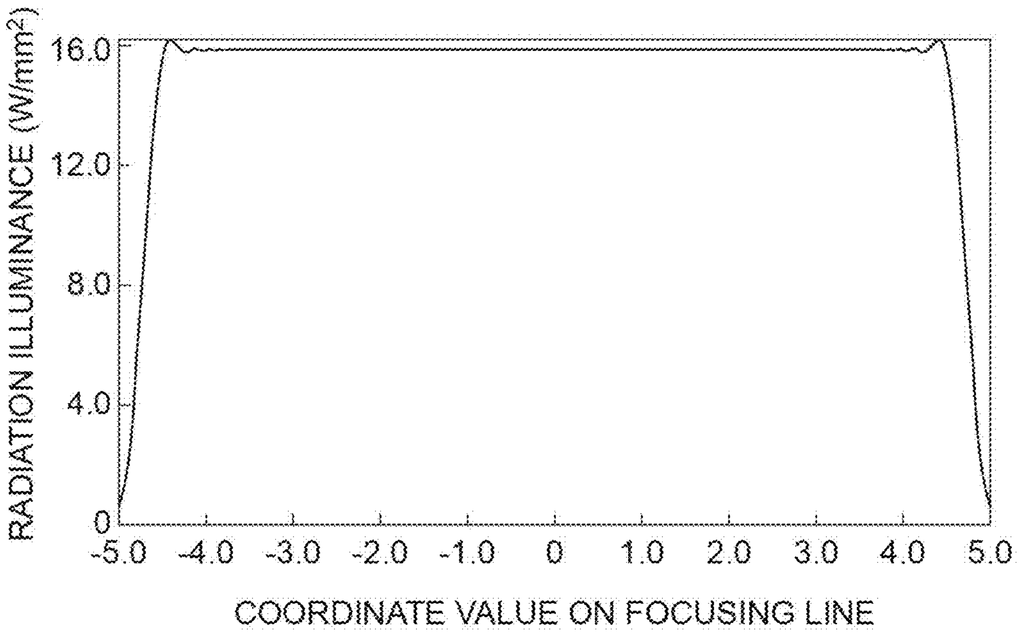
FIG. 7B is a graph representing a radiation illuminance distribution of planar light acquired in a case in which this aperture mask is used.

As illustrated in FIG. 7B, a radiation illuminance distribution of planar light L1 formed in a case in which the aperture mask 22D is used is almost the same as that formed in a case in which the aperture mask 22A is used. When the result illustrated in FIG. 7B and the result illustrated in FIG. 4B are compared with each other, in the result illustrated in FIG. 7B, rising parts of a radiation illuminance distribution near both ends of planar light L1 in the X-axis direction are steep, and amplitudes of the radiation illuminance distribution near both the ends in the X-axis direction are slightly decreased. In the example illustrated in FIG. 7A, although the unevenness of the opening edge 25A having the zigzag shape has a steep shape, the unevenness of the opening edge 25A may have a curved shape such as an arc shape, a sine wave shape, or the like.

Figure 8A:
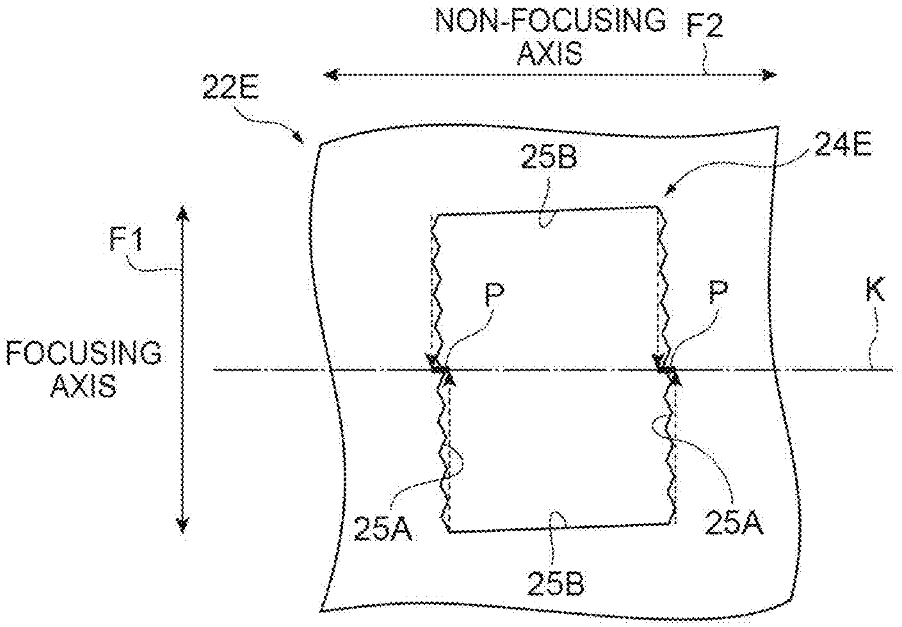
FIG. 8A is a diagram illustrating a shape of an opening part of an aperture mask according to further another embodiment.
Figure 8B:
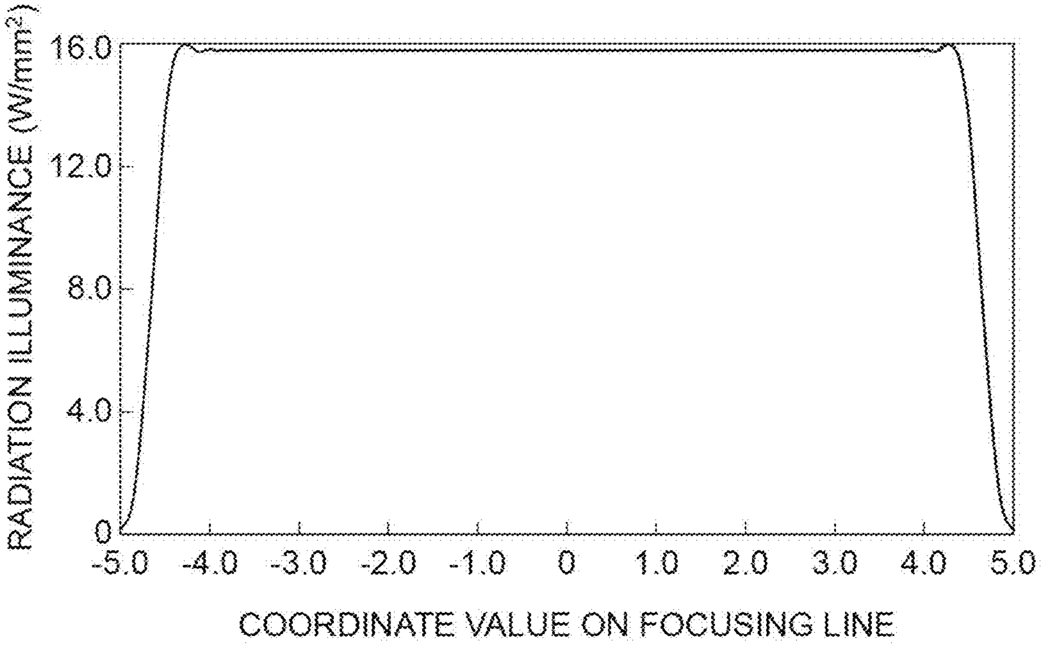
FIG. 8B is a graph representing a radiation illuminance distribution of planar light acquired in a case in which this aperture mask is used.

In addition, as in an aperture mask 22E illustrated in FIG. 8A, the opening edges 25A may have a zigzag shape together with rotating an opening part 24E having a rectangular shape (a quadrangle shape) around an optical axis of light L0 by a predetermined angle. Also in a case in which such an aperture mask 22E is used, as illustrated in FIG. 8B, a radiation illuminance distribution of the planar light L1 that is almost the same as that formed in a case in which the aperture mask 22D is used can be acquired.

Figure 9A:
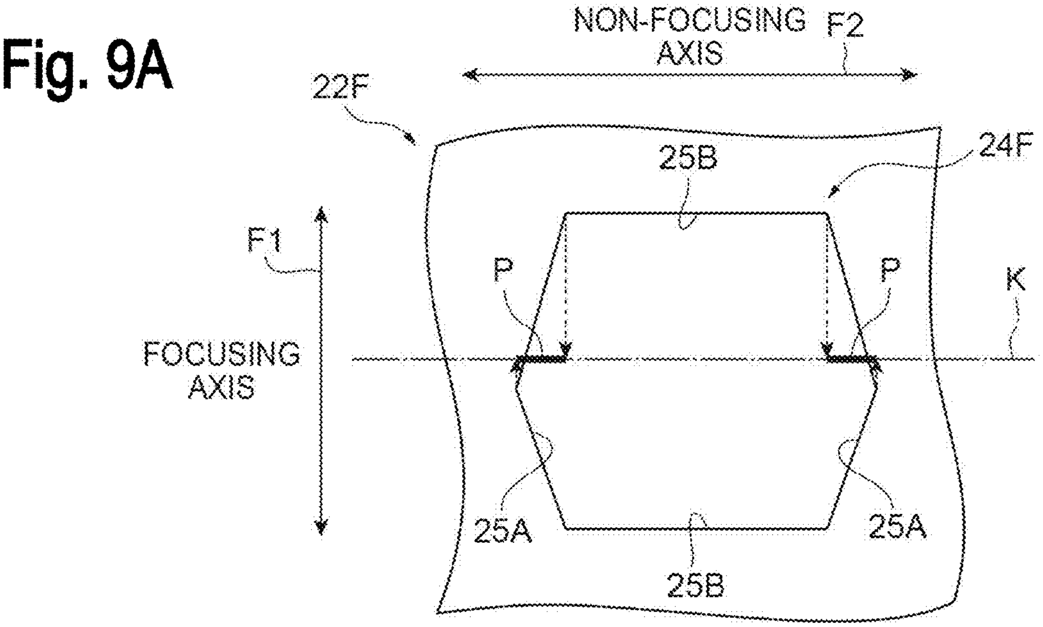
FIG. 9A is a diagram illustrating a shape of an opening part of an aperture mask according to further another embodiment.

FIG. 9A is a diagram illustrating a shape of an opening part of an aperture mask according to further another embodiment. In the aperture mask 22F illustrated in the drawing, opening edges 25A of an opening part 24F have a shape protruding to the outer side of a focusing line K. More specifically, in the example illustrated in FIG. 9A, the shape of the opening part 24F is a hexagonal shape, and two sides facing each other are disposed along a direction parallel to a non-focusing axis F2. The shape of the opening part 24F is not a regular hexagonal shape, and, in the opening edge 25A, a state is formed in which positions of corners of the hexagon are biased to one side (here, a lower side of the sheet face) of the focusing line K. Thus, similar to the opening part 24C of the aperture mask 22C, this opening part 24F has an asymmetrical shape with respect to the focusing line K. The positions of the corners of the hexagon may be in the state of being biased to the other side (an upper side of the sheet face) of the focusing line K.

Figure 9B:
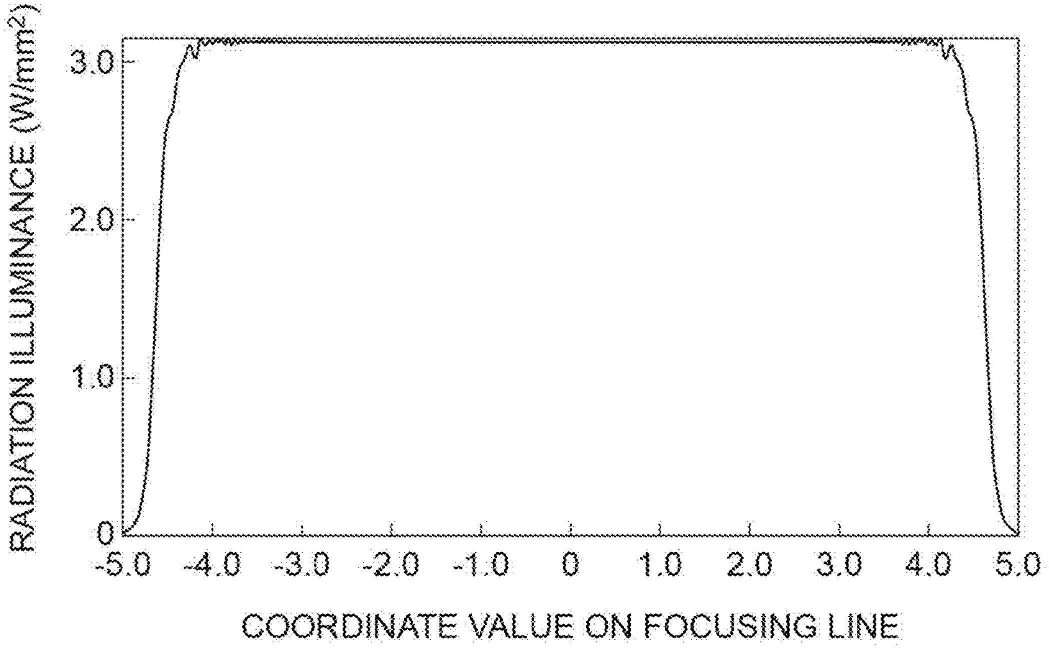
FIG. 9B is a graph representing a radiation illuminance distribution of planar light acquired in a case in which this aperture mask is used.

Also in such an aperture mask 22F, in a case in which the opening edge 25A is projected onto a focusing line, a projected portion P of the opening edge 25A on the focusing line K has a linear spread. For this reason, also in the aperture mask 22F, when light L0 that has passed through the opening part 24F is focused by a light focusing element 23, interference fringes due to diffraction in the opening edge 25A can be suppressed from overlapping each other on the focusing line K and being strengthened together. As illustrated in FIG. 9B, a radiation illuminance distribution of planar light L1 formed in a case in which the aperture mask 22C is used is almost the same as that formed in a case in which the aperture mask 22A is used, and the amplitudes of the radiation illuminance distribution near both ends in the X-axis direction are further suppressed.

Figure 10A:
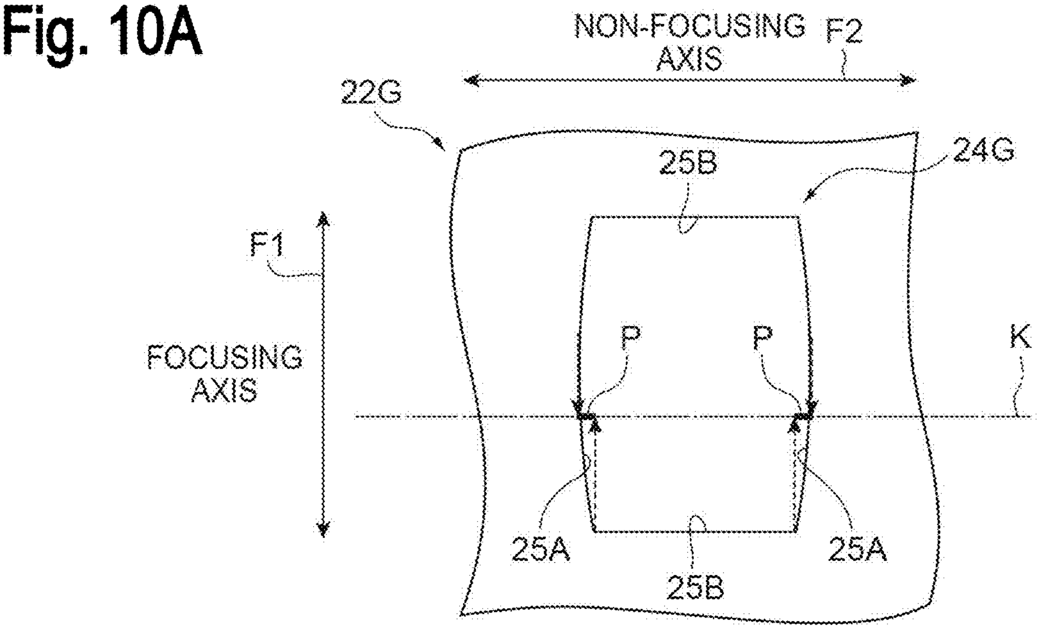
FIG. 10A is a diagram illustrating a shape of an opening part of an aperture mask according to further another embodiment.
Figure 10B:
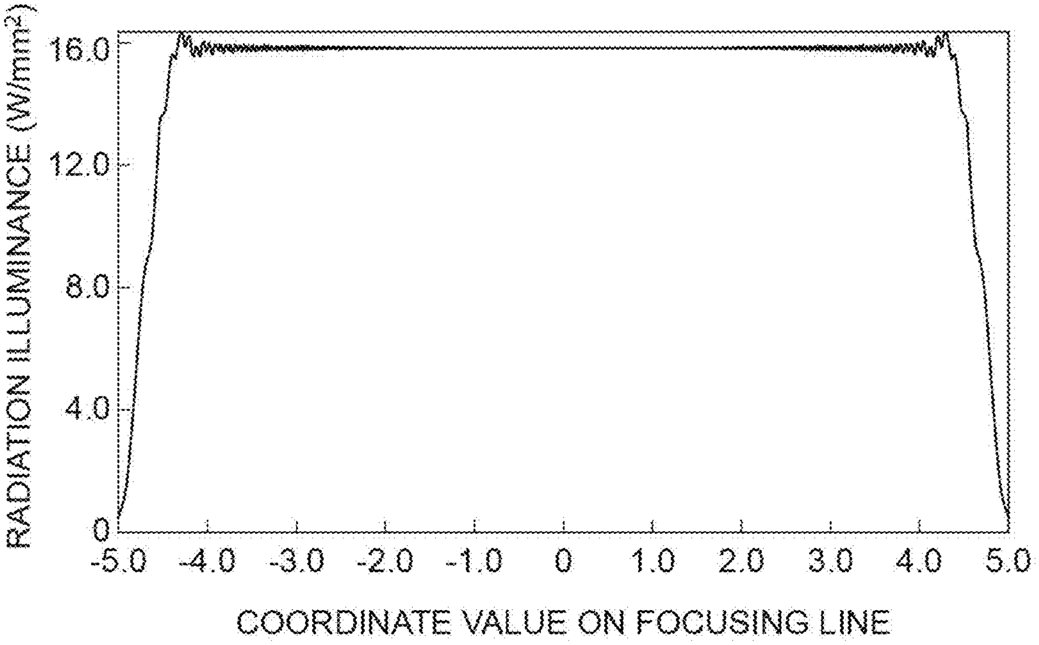
FIG. 10B is a graph representing a radiation illuminance distribution of planar light acquired in a case in which this aperture mask is used.

As a form in which the opening edge 25A has a shape protruding to the outer side of the focusing line K, for example, like an aperture mask 22G illustrated in FIG. 10A, a shape in which the opening edge 25A of an opening part 24G having a rectangular shape is gently bent such that it protrudes to the outer side may be used. In this case, as illustrated in FIG. 10B, in a radiation illuminance distribution of the planar light L1, slight amplitudes occur in rising portions of the radiation illuminance distribution at near both ends in the X-axis direction, and almost the same result as that acquired in a case in which the aperture mask 22A is used is acquired as a whole.

Figure 11A:
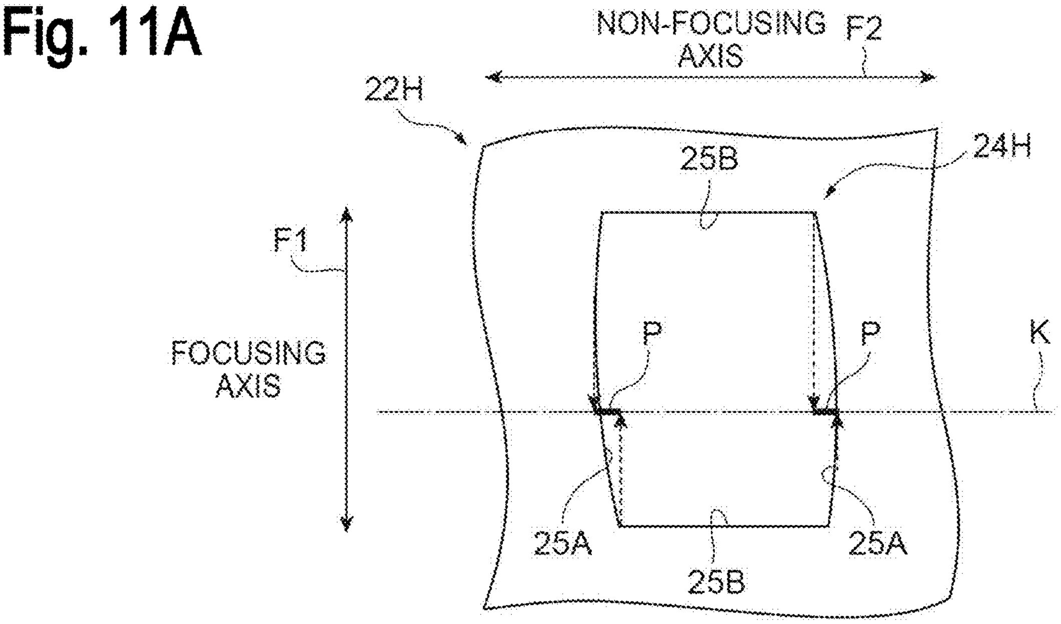
FIG. 11A is a diagram illustrating a shape of an opening part of an aperture mask according to further another embodiment.
Figure 11B:
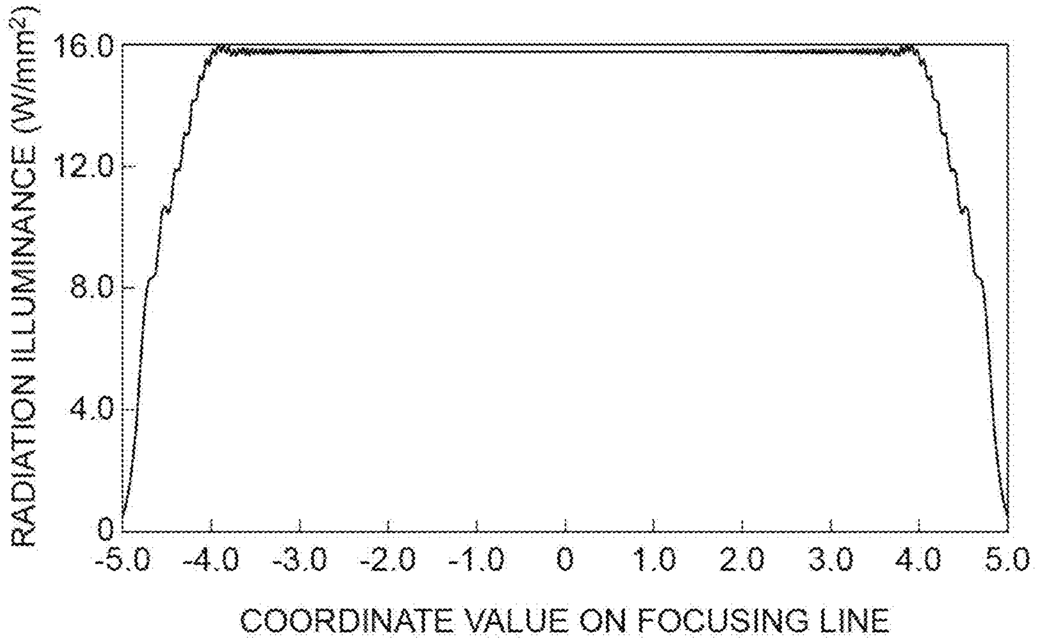
FIG. 11B is a graph representing a radiation illuminance distribution of planar light acquired in a case in which this aperture mask is used.

In addition, as another form in which the opening edge 25A has a shape protruding to the outer side of the focusing line K, for example, like an aperture mask 22H illustrated in FIG. 11A, a shape in which the opening edge 25A is gently bent such that it protrudes to the outer side together with rotating an opening part 24H having a rectangular shape around an optical axis of the light L0 by a predetermined angle may be used. In this case, as illustrated in FIG. 11B, in a radiation illuminance distribution of the planar light L1, slight amplitudes occur in rising portions of the radiation illuminance distribution at near both ends in the X-axis direction, and almost the same result as that acquired in a case in which the aperture mask 22A is used is acquired as a whole.

REFERENCE SIGNS LIST

1 sample observation apparatus
6 image acquiring unit (detection unit)
21 light source
22 (22A to 22H) aperture mask
23 light focusing element
24 (24A to 24H) opening part
25A opening edge
F1 focusing axis
F2 non-focusing axis
K focusing line
L0 light
L1 planar light
P projected portion
S sample

The invention claimed is:

1. A light irradiation device comprising:
a light source configured to output light having coherence;
a light focusing lens having a focusing axis and a non-focusing axis intersecting with the focusing axis and configured to focus the light on a focusing line so as to generate planar light; and
an aperture mask optically disposed between the light source and the light focusing lens, and having an opening part that limits a part of luminous flux of the light transmitted from the light source to the light focusing lens,
wherein the opening part has an asymmetrical shape with respect to the focusing line, and
wherein the opening part is defined by linear opening edges.

2. The light irradiation device according to claim 1, wherein the opening edges define shapes protruding to an outer side of the focusing line.

3. The light irradiation device according to claim 1, wherein the opening part has a hexagonal shape.

4. The light irradiation device according to any one of claim 1, wherein the light source is a light source that outputs laser light as the light.

5. A sample observation apparatus comprising:
the light irradiation device according to claim 1; and
a detector configured to detect observation light generated in a sample in accordance with irradiation of the planar light from the light irradiation device.

* * * * *